United States Patent

Bonwick et al.

(10) Patent No.: US 7,415,653 B1
(45) Date of Patent: Aug. 19, 2008

(54) METHOD AND APPARATUS FOR VECTORED BLOCK-LEVEL CHECKSUM FOR FILE SYSTEM DATA INTEGRITY

(75) Inventors: Jeffrey S. Bonwick, Los Altos, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 711 days.

(21) Appl. No.: 10/828,715

(22) Filed: Apr. 21, 2004

(51) Int. Cl.
G11C 29/00 (2006.01)
(52) U.S. Cl. .................. 714/763; 711/162; 714/769; 714/770; 714/771
(58) Field of Classification Search .............. 714/763, 714/773, 769–771; 711/162
See application file for complete search history.

(56) References Cited

U.S. PATENT DOCUMENTS

| | | | |
|---|---|---|---|
| 4,144,522 A | 3/1979 | Kageyama et al. | |
| 4,422,171 A * | 12/1983 | Wortley et al. ............. | 714/748 |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 2002/0004883 A1 | 1/2002 | Nguyen et al. | |
| 2002/0055942 A1 * | 5/2002 | Reynolds ................ | 707/200 |
| 2002/0087788 A1 | 7/2002 | Morris | |
| 2002/0161972 A1 | 10/2002 | Talagala et al. | |
| 2003/0033477 A1 | 2/2003 | Johnson et al. | |

(Continued)

OTHER PUBLICATIONS

Garcia et al. 'Checksum-based loss differentiation,' 4th International Workshop on Mobile and Wireless Communications Network, Sep. 9-11, 2002, pp. 244-248.*

(Continued)

*Primary Examiner*—Guy J. Lamarre
(74) *Attorney, Agent, or Firm*—Osha Liang LLP

(57) ABSTRACT

A method for storing a data block, involving storing the data block in a storage pool, obtaining a data block location, determining a checksum function for the data block, calculating a data block checksum using the checksum function for the data block, and storing a first indirect block in the storage pool, wherein the first indirect block comprises the data block location, the data block checksum, and a checksum function ID corresponding to the checksum function for the data block.

25 Claims, 7 Drawing Sheets

U.S. PATENT DOCUMENTS

| | | |
|---|---|---|
| 2003/0126107 A1 | 7/2003 | Yamagami |
| 2003/0145167 A1 | 7/2003 | Tomita |
| 2004/0098720 A1 | 5/2004 | Hooper |
| 2004/0107314 A1 | 6/2004 | Kim et al. |
| 2004/0123063 A1 | 6/2004 | Dalal et al. |
| 2004/0225834 A1 | 11/2004 | Lu et al. |
| 2004/0234000 A1 | 11/2004 | Page |
| 2005/0010620 A1 | 1/2005 | Silvers et al. |
| 2005/0097270 A1 | 5/2005 | Kleiman et al. |
| 2005/0235154 A1 | 10/2005 | Serret-Avila |
| 2006/0168409 A1 | 7/2006 | Kahn et al. |
| 2006/0218644 A1 | 9/2006 | Niles et al. |
| 2006/0256965 A1 | 11/2006 | Rowe |

OTHER PUBLICATIONS

Goodheart, et al.; "The Magic Garden Explained"; Prentice Hall, pp. 24-25, 29-30, 390-391 1994.

Austin, B.J.; "A Dynamic Disc Allocation Algorithm Designed to Reduce Fragmentation During File Reloading"; pp. 378-381, 1970.

Stallings, W.; "Computer Organization and Architecture: Designing for Performance"; Prentice Hall, Fifth Edition, pp. 377-378, 2000.

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore - 560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, University of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

* cited by examiner

METHOD AND APPARATUS FOR VECTORED BLOCK-LEVEL CHECKSUM FOR FILE SYSTEM DATA INTEGRITY

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Files systems and/or volume managers may include a mechanism for determining whether the data stored within the file system has been corrupted or otherwise altered. One such mechanism is a checksum. The checksum corresponds to a set of bits obtained by applying a particular formula (e.g., Message Digest (MD) 5, Fletcher, Cyclic Redundancy Check (CRC) etc.) to the piece of data. The checksum for the particular piece of data is then stored adjacent to the corresponding data in the file system (e.g., using 520 byte sectors).

SUMMARY

In general, in one aspect, the invention relates to a method for storing a data block, comprising storing the data block in a storage pool, obtaining a data block location, determining a checksum function for the data block, calculating a data block checksum using the checksum function for the data block, and storing a first indirect block in the storage pool, wherein the first indirect block comprises the data block location, the data block checksum, and a checksum function ID corresponding to the checksum function for the data block.

In general, in one aspect, the invention relates to a method for storing a first data block and a second data block, comprising storing the first data block and the second data block in a storage pool, obtaining a first data block location and a second data block location, calculating a first data block checksum for the first data block using a first checksum function, wherein the first checksum function is associated with a first checksum ID, calculating a second data block checksum for the second data block using a second checksum function, wherein the second checksum function is associated with a second checksum ID, and storing an array of block pointers in an indirect block, wherein the array of block pointers comprises a first block pointer comprising the first data block location, the first data block checksum, and the first checksum ID, and a second block pointer comprising the second data block location, the second data block checksum, and the second checksum ID.

In general, in one aspect, the invention relates to a method for retrieving data in a data block, comprising obtaining an indirect block comprising a stored checksum, a stored checksum function ID, and a data block location, obtaining the data block using the data block location, calculating the checksum for the data block using a checksum function corresponding to the stored checksum ID to obtain a calculated checksum, retrieving the data from the data block, if the stored checksum equals the calculated checksum, and performing an appropriate action, if the stored checksum is not equal to the calculated checksum.

In general, in one aspect, the invention relates to a method for storing and retrieving a data block, comprising storing the data block in a storage pool, obtaining a data block location, determining a checksum function for the data block, calculating a data block checksum using the checksum function for the data block, storing an indirect block in the storage pool, wherein the indirect block comprises the data block location, the data block checksum, and a checksum function ID corresponding to the checksum function for the data block, obtaining the indirect block comprising the data block checksum, the checksum function ID, and the data block location, obtaining the data block using the data block location, calculating the checksum for the data block using a checksum function corresponding to the checksum ID to obtain a calculated checksum, retrieving the data from the data block, if the data block checksum equals the calculated checksum, and performing an appropriate action, if the data block checksum is not equal to the calculated checksum.

In general, in one aspect, the invention relates to a system for storing a data block, comprising a storage pool comprising the data block and the first indirect block, wherein the first indirect block comprises a data block checksum, a data block checksum function ID, and a data block location, and a storage pool allocator configured to store the data block and the first indirect block in the storage pool, and a plurality of checksum functions, wherein each of the plurality of checksum functions is associated with a checksum function ID.

In general, in one aspect, the invention relates to a computer system for storing a data block, comprising a processor, a memory, a storage device, and software instructions stored in the memory for enabling the computer system under control of the processor, to store the data block in a storage pool, obtain a data block location, determine a checksum function for the data block, calculate a data block checksum using the checksum function for the data block, and store a first indirect block in the storage pool, wherein the first indirect block comprises the data block location, the data block checksum, and a checksum function ID corresponding to the checksum function for the data block.

In general, in one aspect, the invention relates to a network system having a plurality of nodes, comprising a storage pool comprising the data block and the first indirect block, wherein the first indirect block comprises a data block checksum, a data block checksum function ID, and a data block location, and a storage pool allocator configured to store the data block and the first indirect block in the storage pool, and a plurality of checksum functions, wherein each of the plurality of checksum functions is associated with a checksum function ID, wherein the storage pool is located on any one of the plurality of nodes, and wherein the storage pool allocator is located on any one of the plurality of nodes.

Other aspects of the invention will be apparent from the following description and the appended claims.

DETAILED DESCRIPTION

Figure 1:
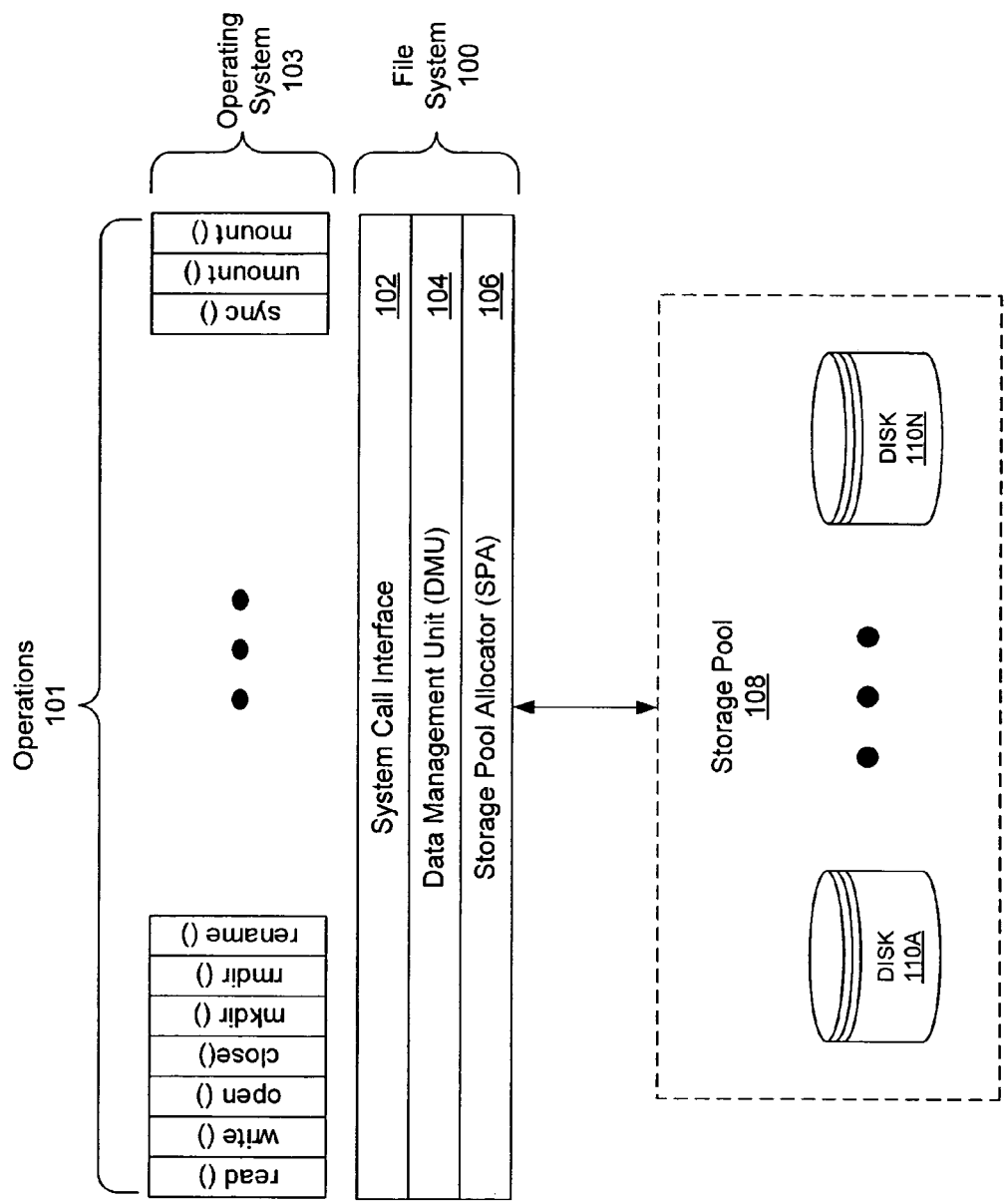
FIG. 1 shows a system architecture in accordance with an embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for using checksums in a file system. More specifically, embodiments of the invention provide a method and apparatus for implementing vectored block-level checksums in a file system. Further, embodiments of the invention provide a method and apparatus for storing the data and the corresponding checksum in different locations, thereby providing robust fault isolation. Further, embodiments of the invention provide a method and apparatus for selecting a checksum function on a per-block basis.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
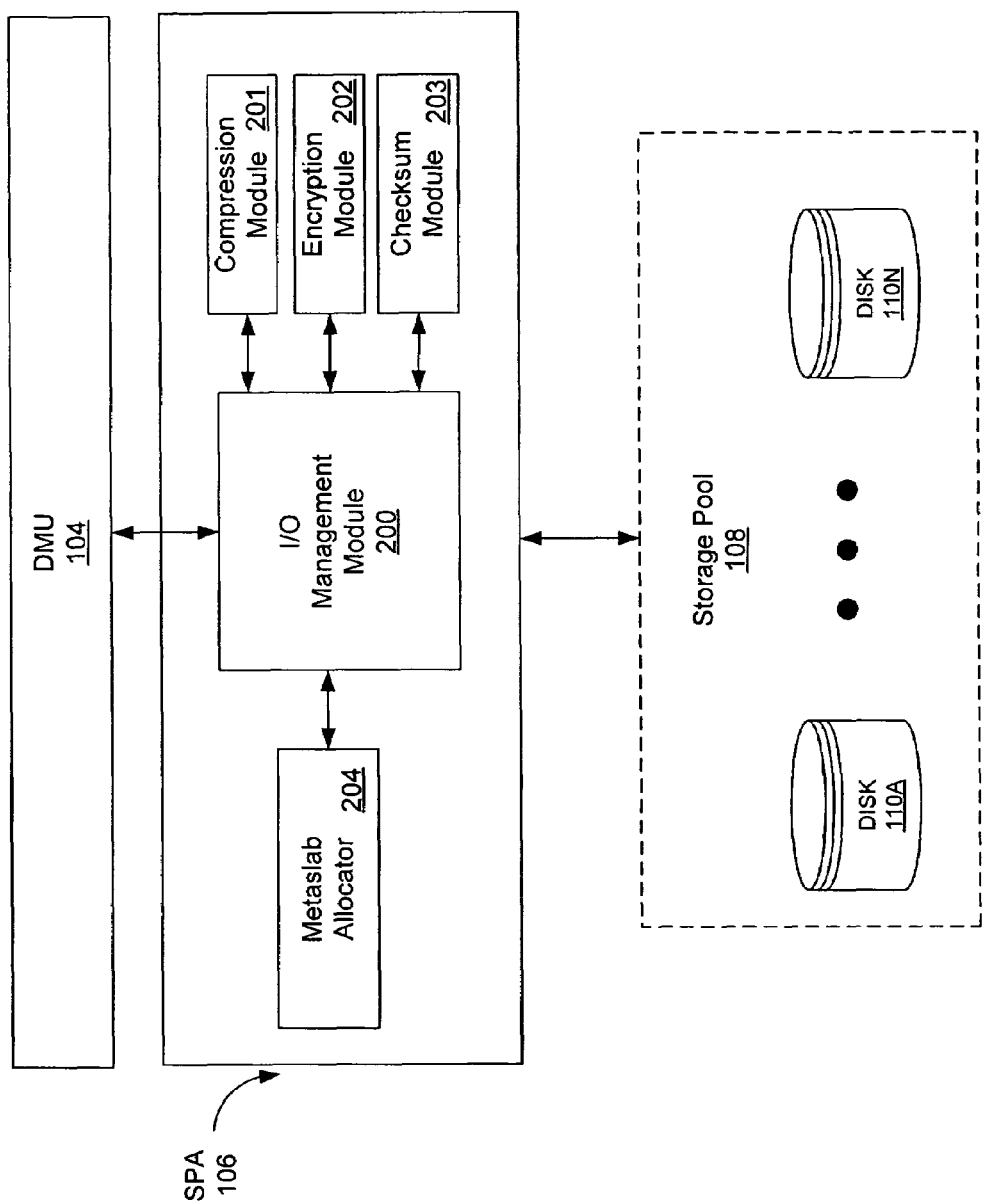
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these modules is described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

Further, in one embodiment of the invention, the checksum module (203) may include a list of checksum functions that are available to the checksum module (203). Specifically, the checksum module (203) may use any of the available checksum components to calculate the checksum for a given block (data block or indirect block). In one embodiment of the invention, each checksum function is identified by a unique ID, e.g., a 5-bit number, etc. The unique identifier may be stored with the corresponding checksum function in the checksum component, for example, in a table indexed by unique ID.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
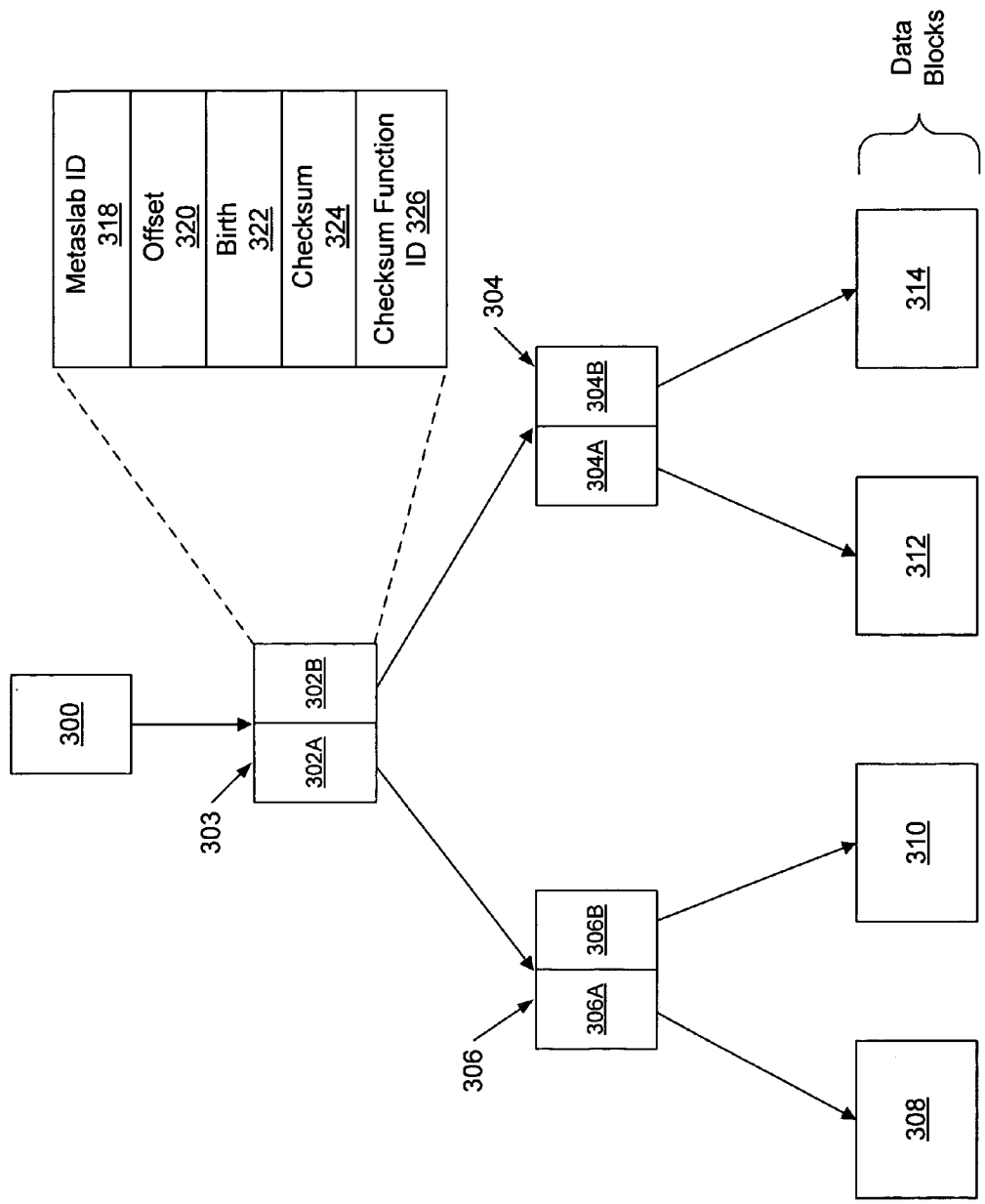
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, 306). In one embodiment of the invention, indirect blocks (302, 304, 306) may be arrays of block pointers (e.g., 302A, 302B, etc.) that, directly or indirectly, reference to data blocks (308, 310, 312, 314). The data blocks (308, 310, 312, 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, a checksum (324) of the data stored in the block (data block or indirect block) referenced by the block pointer, and a checksum function ID (326) corresponding to the checksum function used to calculate the checksum (324).

In one embodiment of the invention, each indirect block includes a metaslab ID (318), an offset (320) within the metaslab, a birth value (322) of the indirect block (i.e., the transaction group in which the indirect block was committed), a checksum (324) of the data stored in the block (data block or indirect block) referenced by the indirect block, In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum, checksum function ID) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
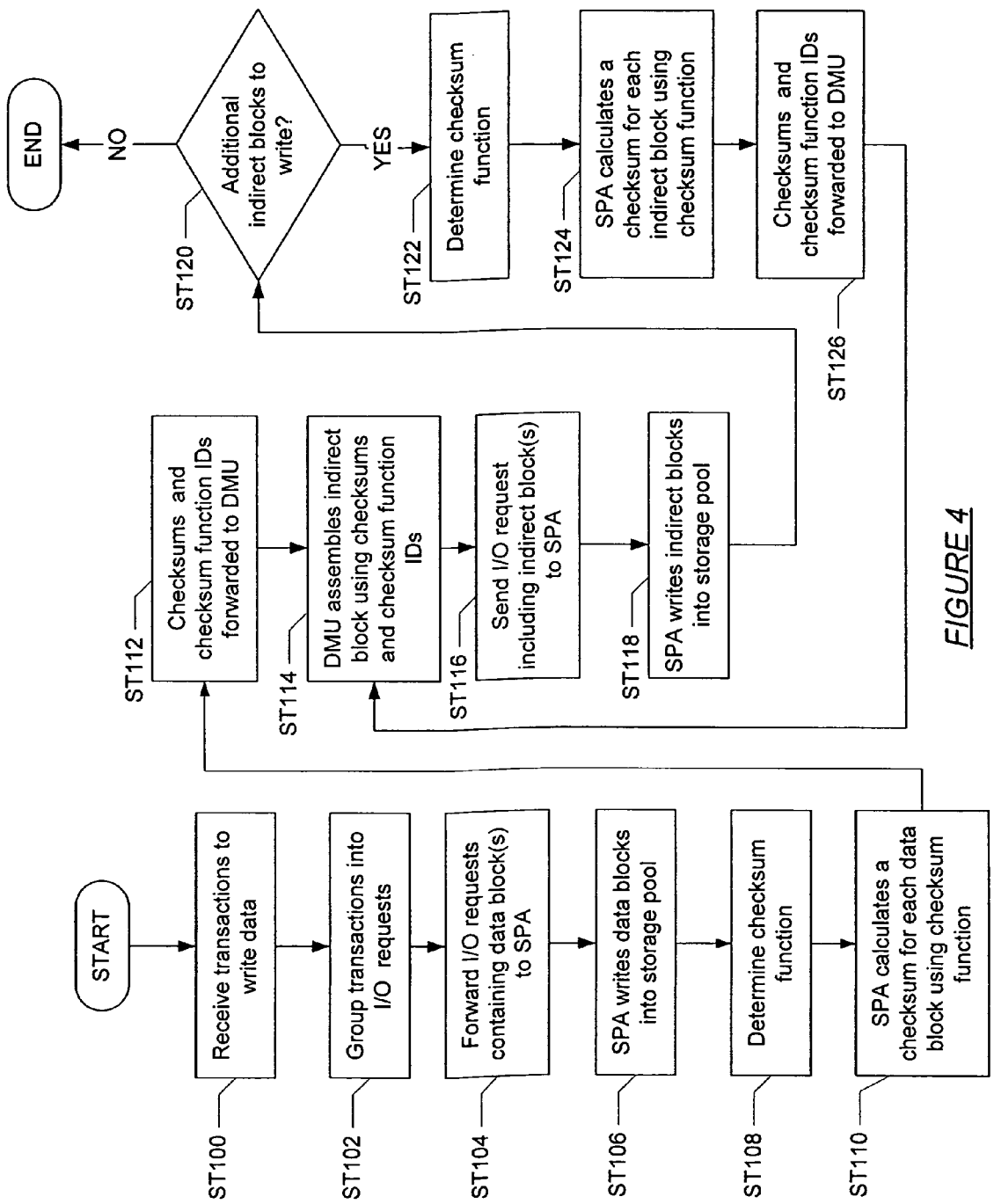
FIG. 4 shows a flow chart in accordance with an embodiment of the invention.

Using the aforementioned infrastructure shown in FIGS. 1-3, the following discussion describes a method for implementing vectored block-level checksums in a file system in accordance with one embodiment of the invention. FIG. 4 shows a flow chart in accordance with one embodiment of the invention. Initially, the DMU receives a transaction from an application, the operating system (or a subsystem therein), etc. (ST 100). The DMU subsequently groups transactions into one or more I/O requests (ST 102). These I/O requests are subsequently forwarded to the SPA (ST 104).

In one embodiment of the invention, each I/O request includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, the I/O request referenced in ST 104 includes data blocks.

Continuing with the discussion of FIG. 4, the SPA, upon receiving the I/O request (including data blocks) from the DMU, writes the data blocks into the storage pool (ST 106). The SPA subsequently determines a checksum function to use when calculating the checksum for each data block written into the storage pool (ST 108). In one embodiment of the invention, the checksum function used for each data block is pre-determined. Alternatively, the checksum function used for each data block is determined dynamically.

The SPA subsequently calculates a checksum using the corresponding checksum function for each data block written into the storage pool (ST 110). In one embodiment, the checksum module (203 in FIG. 2) within the SPA is used to calculate the checksum for each data block written into the storage pool. The checksums are subsequently forwarded to the DMU (ST 112). The DMU then assembles the indirect blocks using the checksums (ST 114). Specifically, the DMU places the checksum for a given data block in the appropriate block pointer within the indirect block (i.e., the parent indirect block of the data block). Next, the indirect blocks are forwarded to the SPA (ST 116). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 118). A determination is then made whether additional indirect blocks exist to write into the storage pool (i.e., whether the last indirect block written to the storage pool corresponds to the root block) (ST 120). If no additional indirect blocks exist, then the method is complete. However, if additional indirect blocks exist, then the SPA calculates the checksum from each of the indirect blocks written into the storage pool (ST 122). The checksums for each of the indirect blocks is subsequently forwarded to the DMU (ST 124). Steps ST 114 through ST 126 are subsequently repeated until the root block is written into the storage pool.

Figure 5:
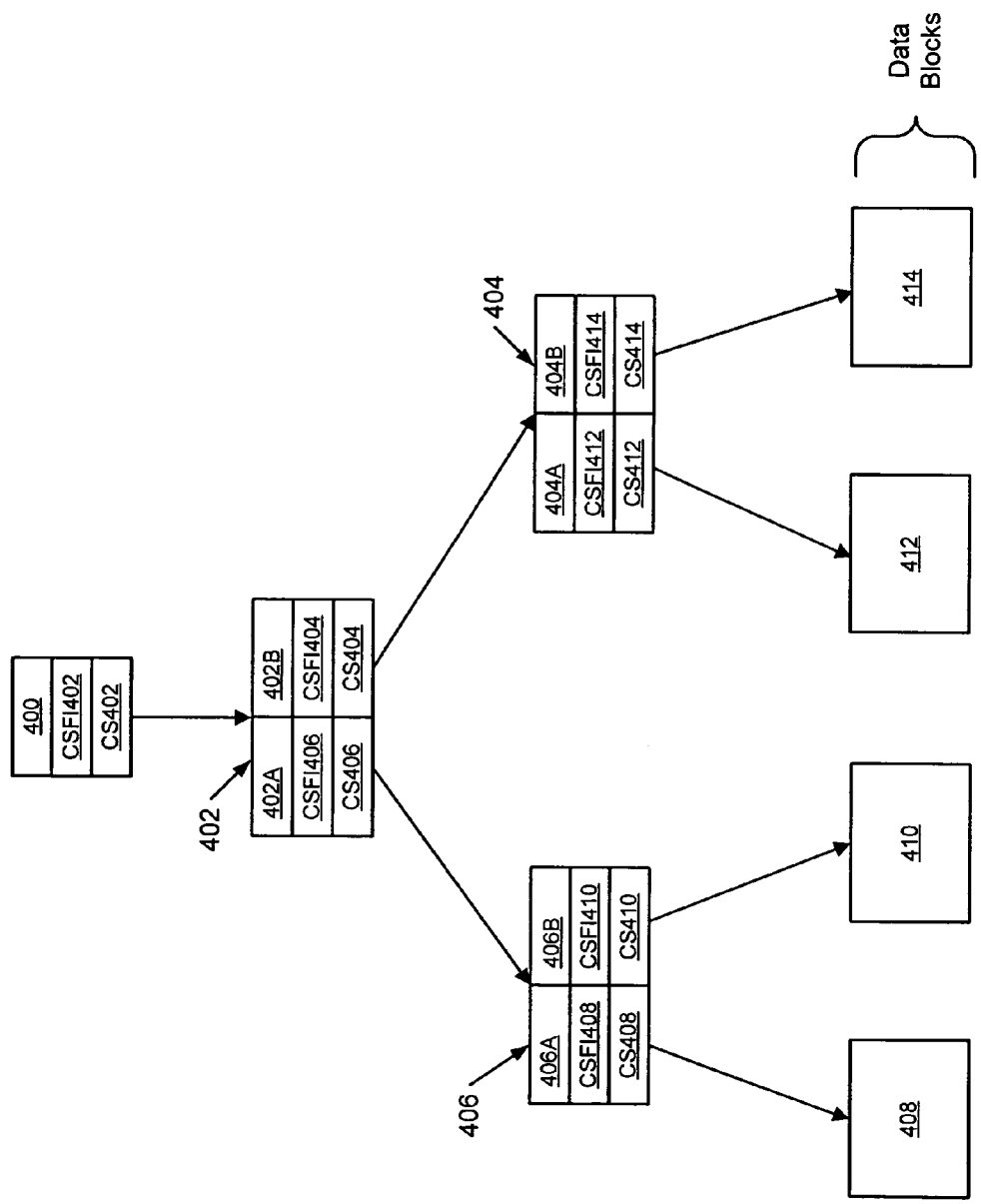
FIG. 5 shows a hierarchical data configuration in accordance with an embodiment of the invention.

FIG. 5 shows a hierarchical data configuration in accordance with an embodiment of the invention. Specifically, FIG. 5 shows a detailed view of the data blocks and indirect blocks resulting from using the method described in FIG. 4, in accordance with one embodiment of the invention. The file system includes four data blocks (i.e., 408, 410, 412, and 414). Each data block (408, 410, 412, 414) within the file system includes a corresponding checksum (CS408, CS410, CS412, CS414, respectively) and checksum function ID (CSFI408, CSFI410, CSFI412, CSFI414, respectively) stored in the corresponding block pointer (406A, 406B, 404A, 404B, respectively) within the parent indirect block (406, 404, respectively). Each of the block pointers (i.e., 406A, 406B, 404A, 404B) is stored in an indirect block (i.e., 404, 406). Each indirect block (404, 406) also has a corresponding checksum (CS404, CS406, respectively) and checksum function ID (CSFI404, CSFI406, respectively) stored in corresponding block pointers in a parent indirect block. Specifically, block pointer (402A) includes the checksum (CS406) and checksum function ID (CSFI406) for the indirect block (406), and block pointer (402B) includes the checksum (CS404) and checksum function ID (CSFI404) for the indirect block (404). In this particular example, the indirect block (402) is referenced by a root block (400). The root block (400) includes the checksum (CS402) and checksum function ID (CSFI402) for the indirect block (402).

Figure 6:
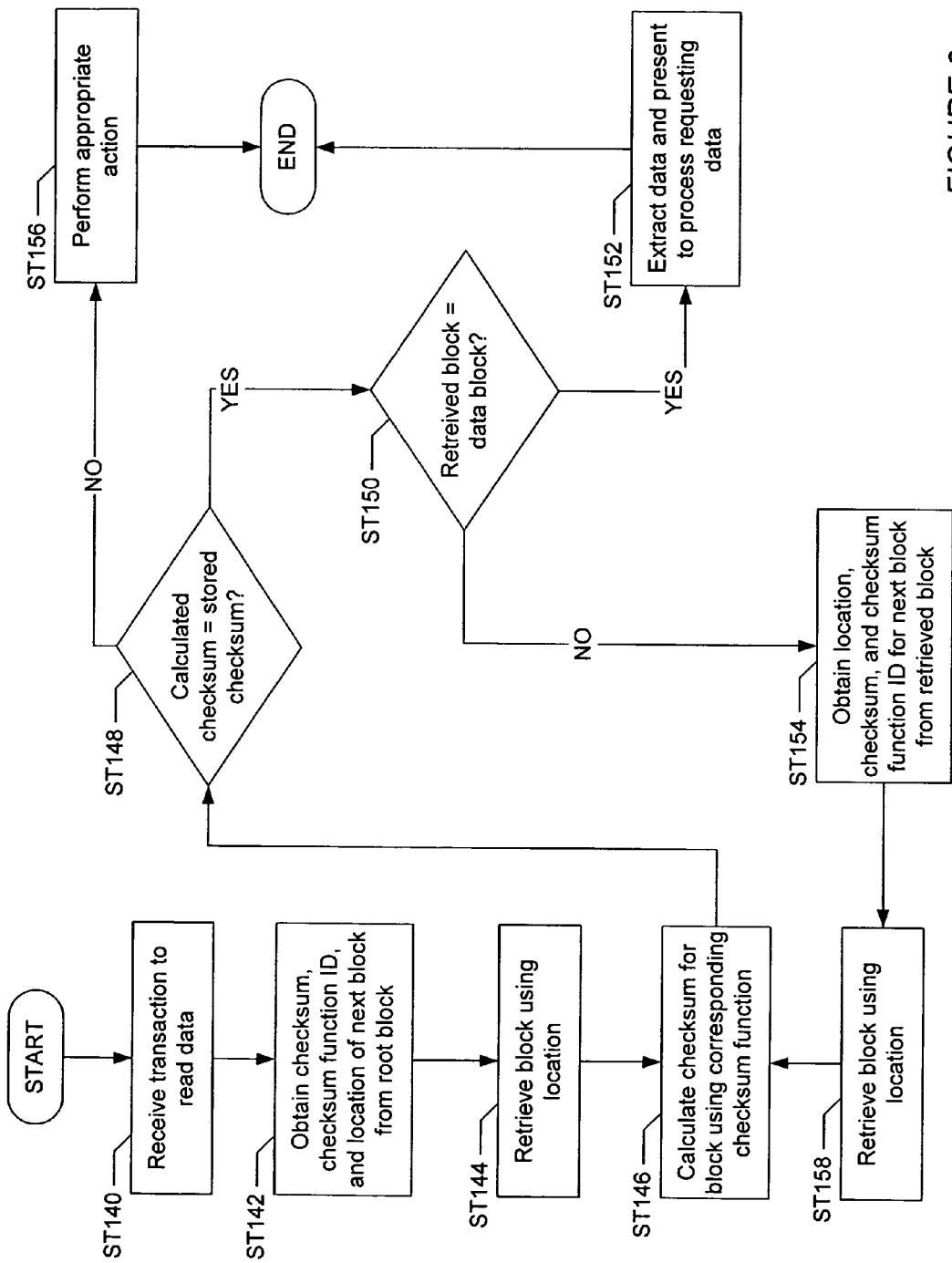
FIG. 6 shows a flow chart in accordance with an embodiment of the invention.

FIG. 6 shows a flow chart in accordance with one embodiment of the invention. More specifically, FIG. 6 details a method for reading data in accordance with one embodiment of the invention. Initially, a transaction to read data is received (ST 140). A checksum, corresponding checksum function ID and a location to the next block (i.e., a data block or an indirect block) stored in the root block, is subsequently retrieved (ST 142). The location (e.g., the metaslab ID and offset) is subsequently used to obtain the block (i.e., the data block or the indirect block) (ST 144). The checksum of the retrieved block is then calculated using the checksum function corresponding to the checksum function ID (ST 146). A determination is subsequently made whether the stored checksum is equal to the calculated checksum (ST 148). If the stored checksum is not equal to the calculated checksum, then an appropriate action is performed (e.g., an error message is generated indicating that the data is corrupted) (ST 156).

If the stored checksum is equal to the calculated checksum, then a determination is made whether the retrieved block is the data block (ST 150). If the retrieved block is the data block, then the data is extracted from the data block and presented to the process requesting the data (ST 152). Alternatively, if the retrieved block is not the data block, then the location, checksum, and checksum function ID for the next block (stored within the retrieved block) are obtained (ST 154). The block (data block or indirect block) at the location is subsequently obtained (ST 158). Steps 144 through 154 are subsequently repeated until either data corruption is encountered (i.e., ST 148) or the data block is encountered (i.e., ST 152).

Figure 7:
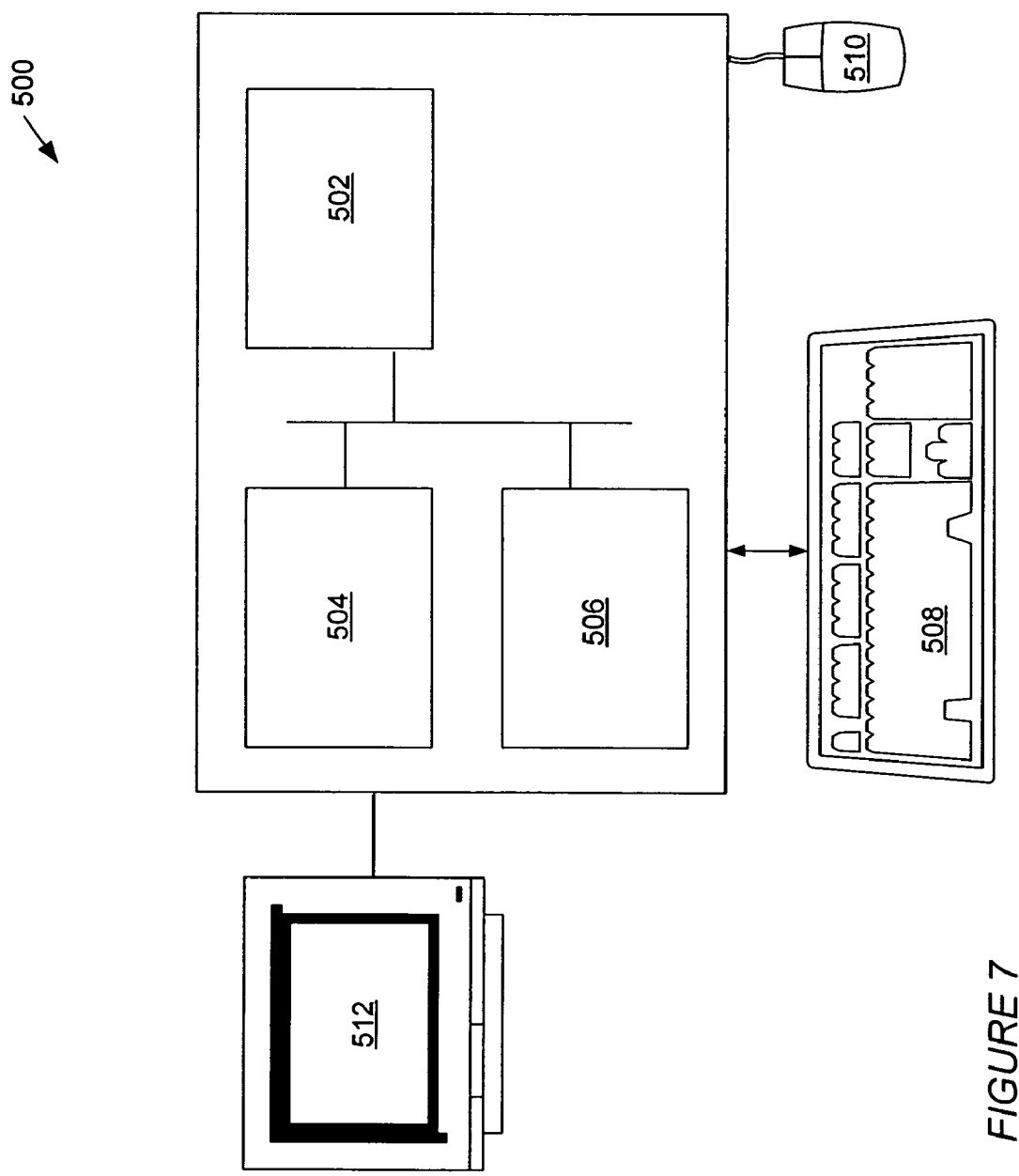
FIG. 7 shows a computer system in accordance with an embodiment of the invention.

The invention may be implemented on virtually any type of computer regardless of the platform being used. For example, as shown in FIG. 7, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (500) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing a data block, comprising:
   storing the data block in a storage pool;
   obtaining a data block location associated with the data block;
   determining a checksum function for the data block;
   calculating a data block checksum using the checksum function for the data block;
   storing a first indirect block in the storage pool, wherein the first indirect block comprises the data block location, the data block checksum, and a checksum function ID corresponding to the checksum function for the data block;
   determining a checksum function for the first indirect block, wherein the checksum function for the first indirect block is associated with a checksum function ID corresponding to the checksum function for the first indirect block;
   calculating a first indirect block checksum using the checksum function for the first indirect block;
   obtaining a first indirect block location associated with the first indirect block; and
   storing a second indirect block in the storage pool, wherein the second indirect block comprises the first indirect block location, the first indirect block checksum, and the checksum function ID corresponding to the checksum function for the first indirect block.

2. The method of claim 1, further comprising:
   assembling the first indirect block, wherein assembling the first indirect block comprises populating a block pointer in the first indirect block.

3. The method of claim 2, wherein populating the block pointer comprises:
   storing the data block checksum in a checksum field in the block pointer,
   storing the checksum function ID for the data block in a checksum function ID field in the block pointer; and
   storing the data block location in the block pointer, wherein storing the data block location comprises storing a metaslab ID and offset.

4. The method of claim 3, further comprising:
   storing a birth value in a birth field in the block pointer.

5. The method of claim 2, wherein the first indirect block is assembled using a data management unit.

6. The method of claim 1, wherein the storage pool comprises at least one storage device.

7. The method of claim 1, wherein the storage pool is divided into a plurality of metaslabs.

8. The method of claim 7, wherein each of the plurality of metaslabs is associated with a metaslab ID.

9. The method of claim 7, wherein the data block location comprises the metaslab ID and an offset.

10. The method of claim 1, wherein storing the data block comprises using a storage pool allocator.

11. A method for storing a first data block and a second data block, comprising:
    storing the first data block and the second data block in a storage pool;
    obtaining a first data block location and a second data block location;
    selecting a first checksum function and a second checksum function from a plurality of checksum functions wherein the first checksum function is associated with a first checksum function ID and the second checksum function is associated with a second checksum function ID;
    calculating a first data block checksum for the first data block using the first checksum function, wherein the first checksum function is associated with the first checksum function ID;
    calculating a second data block checksum for the second data block using the second checksum function, wherein the second checksum function is associated with the second checksum function ID; and
    storing an array of block pointers in an indirect block, wherein the array of block pointers comprises:
       a first block pointer comprising the first data block location, the first data block checksum, and the first checksum function ID, and
       a second block pointer comprising the second data block location, the second data block checksum, and the second checksum function ID.

12. The method of claim 11, wherein the indirect block is assembled using a data management unit.

13. The method of claim 11, wherein the indirect block is stored using a storage pool allocator.

14. A method for retrieving data in a data block, comprising:
    obtaining a first indirect block comprising a first stored checksum, a first stored checksum function ID, and a second indirect block location;
    obtaining a second indirect block using the second indirect block location, wherein the second indirect block comprises a second stored checksum, a second stored checksum function ID, and a data block location;
    obtaining the data block using the data block location;
    calculating the checksum for the data block using a checksum function corresponding to the second stored checksum ID to obtain a calculated checksum;
    retrieving the data from the data block, if the second stored checksum equals the calculated checksum; and
    performing an appropriate action, if the second stored checksum is not equal to the calculated checksum.

15. The method of claim 14, wherein the indirect block is assembled using a data management unit.

16. The method of claim 14, wherein the calculated checksum is calculated using a storage pool allocator.

17. A method for storing and retrieving a data block, comprising:
    storing the data block in a storage pool;
    obtaining a data block location associated with the data block;
    determining a checksum function for the data block;
    calculating a data block checksum using the checksum function for the data block;
    storing a first indirect block in the storage pool, wherein the first indirect block comprises the data block location, the data block checksum, and a data block; checksum function ID corresponding to the checksum function for the data block;
    determining a checksum function for the first indirect block, wherein the checksum function for the first indirect block is associated with a first indirect block checksum function ID corresponding to the checksum function for the first indirect block;

calculating a first indirect block checksum using the checksum function for the first indirect block;
obtaining a first indirect block location; and
storing a second indirect block in the storage pool, wherein the second indirect block comprises the first indirect block location, the first indirect block checksum, and the first indirect block checksum function ID;
obtaining the first indirect block comprising the data block checksum, the data block checksum function ID, and the data block location;
obtaining the data block using the data block location;
calculating the checksum for the data block using the checksum function for the data block corresponding to the data block checksum function ID to obtain a calculated checksum;
retrieving the data from the data block, if the data block checksum equals the calculated checksum; and
performing an appropriate action, if the data block checksum is not equal to the calculated checksum.

18. A system for storing a data block, comprising:
a storage pool comprising:
the data block;
a first indirect block, wherein the first indirect block comprises a data block checksum, a data block checksum function ID, and a data block location, wherein the data block checksum is calculated using a data block checksum function, wherein the data block checksum function corresponds to the data block checksum function ID;
a second indirect block, comprising a first indirect block checksum, a first indirect block checksum function ID, and a first indirect block location, wherein the first indirect block checksum is calculated using a first indirect block checksum function, wherein the first indirect checksum function corresponds to the first indirect block checksum function ID;
wherein the data block checksum function ID and the first indirect block checksum function ID correspond to checksum functions selected from a plurality of checksum functions implemented by the system; and
a storage pool allocator configured to store the data block, the first indirect block, and the second indirect block in the storage pool.

19. The system of claim of claim 18, further comprising:
a data management unit configured to assemble the first indirect block and request the storage pool allocator store the first indirect block.

20. The system of claim 18, wherein the storage pool comprises at least one storage disk.

21. The system of claim 18, wherein the storage pool is divided into a plurality of metaslabs.

22. The system of claim 21, wherein each of the plurality of metaslabs is associated with a metaslab ID.

23. The system of claim 22, wherein the data block location comprises the metaslab ID and an offset.

24. A computer system for storing a data block, comprising:
a processor;
a memory;
a storage device; and
software instructions stored in the memory for enabling the computer system under control of the processor, to:
store the data block in a storage pool;
obtain a data block location;
determine a checksum function for the data block;
calculate a data block checksum using the checksum function for the data block;
store a first indirect block in the storage pool, wherein the first indirect block comprises the data block location, the data block checksum, and a data block checksum function ID corresponding to the checksum function for the data block;
determine a checksum function for the first indirect block, wherein the checksum function for the first indirect block is associated with a first indirect block checksum function ID corresponding to the checksum function for the first indirect block;
calculate a first indirect block checksum using the checksum function for the first indirect block;
obtain a first indirect block location; and
store a second indirect block in the storage pool, wherein the second indirect block comprises the first indirect block location, the first indirect block checksum, and the first indirect block checksum function ID.

25. A network system having a plurality of nodes, comprising:
a storage pool comprising:
a data block;
a first indirect block, wherein the first indirect block comprises the data block checksum, the data block checksum function ID, and the data block location, wherein the data block checksum is calculated using the data block checksum function, wherein the data block checksum function corresponds to the data block checksum function ID;
a second indirect block, wherein the second indirect block comprises the first indirect block checksum, the first indirect block checksum function ID, and the first indirect block location, wherein the first indirect block checksum is calculated using the first indirect block checksum function, wherein the first indirect block checksum function corresponds to the first indirect block checksum function ID;
wherein the data block checksum function ID and the first indirect block checksum function ID correspond to checksum functions selected from a plurality of checksum functions implemented by the system; and
a storage pool allocator configured to store the data block, the first indirect block, and the second indirect block in the storage pool;
wherein the storage pool is located on any one of the plurality of nodes; and wherein the storage pool allocator is located on any one of the plurality of nodes.

* * * * *